(12) United States Patent
Schwenger et al.

(10) Patent No.: US 7,474,950 B2
(45) Date of Patent: Jan. 6, 2009

(54) METHOD FOR DETERMINING THE CLUTCH APPLICATION POINT

(75) Inventors: Andreas Schwenger, Wolfsburg / Reislingen (DE); Otto Ebner, Friedrichshafen (DE); Klaus Schweiger, Friedrichshafen (DE); Matthias Winkel, Weingarten (DE); Christoph Rüchardt, Bodolz (DE); Marcus Gansohr, Salem (DE); Thomas Knoblauch, Saarbrücken (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 736 days.

(21) Appl. No.: 10/499,512

(22) PCT Filed: Dec. 17, 2002

(86) PCT No.: PCT/EP02/14377

§ 371 (c)(1),
(2), (4) Date: Jun. 21, 2004

(87) PCT Pub. No.: WO03/054410

PCT Pub. Date: Jul. 3, 2003

(65) Prior Publication Data

US 2005/0051408 A1 Mar. 10, 2005

(30) Foreign Application Priority Data

Dec. 21, 2001 (DE) .................. 101 63 438

(51) Int. Cl.
*G06F 17/00* (2006.01)

(52) U.S. Cl. .................. 701/67; 701/68; 73/118.1; 73/1.79; 73/1.81

(58) Field of Classification Search .................. 701/67, 701/68; 73/118.1, 1.79, 1.81
See application file for complete search history.

(56) References Cited

U.S. PATENT DOCUMENTS 4,967,884 A * 11/1990 Norcia .................. 192/13 A
6,094,976 A * 8/2000 Hayashi et al. ............. 73/118.1

FOREIGN PATENT DOCUMENTS

| DE | 34 38 594 A1 | 4/1986 |
|---|---|---|
| DE | 37 31 259 A1 | 4/1988 |
| DE | 44 34 111 A1 | 3/1996 |
| DE | 694 00 834 T2 | 5/1997 |
| DE | 196 03 239 A1 | 7/1997 |
| DE | 196 17 446 A1 | 11/1997 |
| DE | 198 02 537 A2 | 7/1999 |
| DE | 199 45 806 A1 | 5/2000 |
| DE | 199 05 964 A1 | 8/2000 |
| EP | 0 550 222 A2 | 7/1993 |
| EP | 0 939 239 A2 | 2/1999 |
| GB | 2 210 127 A | 6/1989 |
| JP | 60-179526 A | 9/1985 |
| JP | 61-143231 A | 6/1986 |

(Continued)

*Primary Examiner*—Khoi H. Tran
*Assistant Examiner*—Marie A Weiskopf
(74) *Attorney, Agent, or Firm*—Davis Bujold & Daniels, P.L.L.C.

(57) ABSTRACT

A method is proposed for determining a clutch application point in a transmission of a vehicle having a spring-actuated clutch system in which the clutch application point is adapted according to at least one adequate regulated quantity of the clutch system.

11 Claims, 1 Drawing Sheet

FOREIGN PATENT DOCUMENTS

| | | |
|---|---|---|
| JP | 1-120438 A | 5/1989 |
| JP | 6-17843 A | 1/1994 |
| JP | 6-62998 A | 3/1994 |
| JP | 6-342044 A | 12/1994 |
| JP | 9-25949 A | 1/1997 |
| JP | 11-82561 A | 3/1999 |
| JP | 2000-266005 A | 9/2000 |
| JP | 2001-182756 A | 7/2001 |
| WO | WO 01/61205 A1 | 8/2001 |
| WO | WO 01/63136 A1 | 8/2001 |

\* cited by examiner

METHOD FOR DETERMINING THE CLUTCH APPLICATION POINT

This application is a national stage completion of PCT/EP02/14377 filed Dec. 17, 2002 which claims priority from German Application Serial No. 101 63 438.2 filed Dec. 21, 2001.

FIELD OF THE INVENTION

A method for determining the clutch application point in a transmission of a vehicle having a spring-actuated clutch system.

BACKGROUND OF THE INVENTION

A method for finding or determining the clutch application point is known in which a rotational speed sensor mounted on the transmission side is evaluated. The transmission is shifted to neutral and the clutch is slowly transferred from the open state to the closed state. With the aid of the rotational speed sensor, a change in the transmission input rotational speed can be established. When the clutch is behind the application point, a torque is transmitted with the clutch. This point at which the clutch has an intermittent behavior is designated as the application point. This disadvantageous method can be applied only while the engine is running. Furthermore, an additional built-in sensor of transmission input rotational speed is needed thereby increasing the production costs.

EP 0 550 222 A2 has also disclosed a method for determining a clutch application point which can only be applied while the engine is running.

Known also is a method for finding or determining the clutch application point in which the injection amount of the engine, during gear introduction is evaluated in idling speed. The clutch is transferred from the open state to the closed state. The idling speed regulator of the engine constantly tries to regulate the rotational speed of the engine. When the load on the engine output side increases in idling speed, the engine regulator reacts with an increase of the injection amount. The increase is used for detecting the application point. In this method, extensive information of the engine is disadvantageously required. Besides, this known method also can only be used while the engine is running. In case of possible failure of he communication between the engine and the transmission, this kind of detection is not possible.

The problem on which this invention is based is to introduce a method for determining a clutch application point in which an availability as great as possible is ensured specially at moderate cost.

SUMMARY OF THE INVENTION

An inventive method is accordingly proposed where the clutch application point is adapted according to an adequate regulated quantity. Of special advantage in this method is that the method can also be applied when the engine is disconnected. Furthermore, no additional sensor system is required for detecting rotational speed signals and/or injection amount signals. The method can be easily implemented thus reducing the cost.

One development of the invention can require that the disengaging load, provided for actuating the clutch system, is used as regulated quantity. The disengaging load acts against a contact force, which is assumed when the clutch is closed by the prestress, for example, of a plate spring. Diaphragm spring plates, for example, are actuated by the disengaging load in the disengaging load system. As soon as the contact force is leveled by the disengaging load, the opening of the clutch system begins so that the clutch application point is reached.

In the inventive method, the clutch application point can be found via the disengagement path by a common intersection point of the curve of the disengaging load and the curve of the spring tension.

According to another development of the invention, the clutch application point is characterized by a jog in the gradient curve. Therefore, the gradient curve of the disengagement load and the job can be determined in the inventive method so as to obtain the designed clutch application point.

It is possible that to determine the gradient curve of the disengagement load. The disengagement load can be inferred from measurements of adequate regulated quantities so that, for example, by stages one gradient provided before and one after the jog can be determined. With these found gradients can uphill gradients be determined uphill gradients and thus corresponding straight lines whose common intersection point then indicates the jog point and thus also the clutch application point.

One development of this invention can provide that in case of a mechanically actuated disengagement system, when the clutch is closed the contact force is assumed by the prestress of the plate spring. When the diaphragm spring blades are now actuated in the disengagement system, the contact force can be reduced by the force in the disengager multiplied by the lever. This is shown by the following equation:

$$F_{Anp}(S) = F_{AnpAP} - i_{Lever} F_{Disengagement}(S)$$

with $F_{Anp}(S)$=contact force
$F_{AnpAP}$=contact force on working point
$i_{Lever}$=force reinforcement factor
$F_{Disengagement}(S)$=disengagement load The dependence of the disengagement load on the disengagement path is almost linear in this development, thus applying:

$$F_{Disenagement}(S) = C_{diaphragm\ spring} * S_{Disengagement}$$

with $F_{Disengagement}(S)$=disengagement load
$C_{Diaphragm\ spring}$=spring constant
$S_{Disengagement}$=disengagement path When the contact force assumes the value zero, by actuation of the diaphragm spring blades, the clutch application point has been reached. In this point applies:

$F_{Anp}(S_{Application}) = 0.0$

A jog determined by the system appears precisely at the clutch application point. When the clutch is further opened, the disengagement load changes only with the characteristic line of the spring used, such as a diaphragm spring. The disengagement load in the disengagement system then results by:

$F_{Disengagement}(S) = F_{Plate\ spring}(S_{Plate})/i_{Lever}$

The gradient curve of the disengagement load prior to the jog results from:

$$\frac{d}{dS} F_{Disengagement}(S) = C_{Diaphragm\ spring} \text{ for } S \langle S_{Application}$$

and the gradient curve after the jog results from:

$$\frac{d}{dS} F_{Disengagement}(S) = \frac{d}{dS} F_{Plate\ spring}(S_{Plate})/i_{Lever} \text{ for } S \rangle$$

$S_{Application\ point}$

When no lining suspension is used, the derivation or the gradient curve of the disengagement load on the disengagement system has a jog. When a lining suspension is used, the transition can be continuous. But the transition range can also be determined here.

One other development can provide that the clutch system is transferred by an appropriate actuation system from the closed state to the open state. It is also possible that a change of gradient of disengagement load is determined by evaluating the regulated quantity and the resulting path in the disengagement system. The determination can obviously be carried out also by the transition from open to closed state of the clutch. This is possible in hydraulic, pneumatic and also electric control of the clutch actuator.

For a hydraulic clutch, an actuation device with timed valves can also be provided, for example, for determining the application point, that the clutch opening timed valve is controlled from the closed state of the clutch with constant or defined pulse width. In case of an open state of the clutch with constant or defined pulse width, the clutch-closing valve can likewise be controlled. The stronger the pressure in the clutch slave cylinder, the smaller the step widths obtained become. The flow on the valve depends on the pressure difference. The clutch application point can then be determined by evaluating the detected clutch path.

The inventive method can also be provided in pneumatic control of the clutch actuator. When an electropneumatic system is provided for control of the clutch actuator, the application point can be inferred preferably from the measurements of path and pressure. When an electric system is provided for control of the clutch actuator, the application point can be inferred preferably from the measurements of path, voltage and/or current.

BRIEF DESCRIPTION OF THE DRAWINGS

The invention will now be described, by way of example with reference to the drawings n which

DETAILED DESCRIPTION OF THE INVENTION

Figure 1:
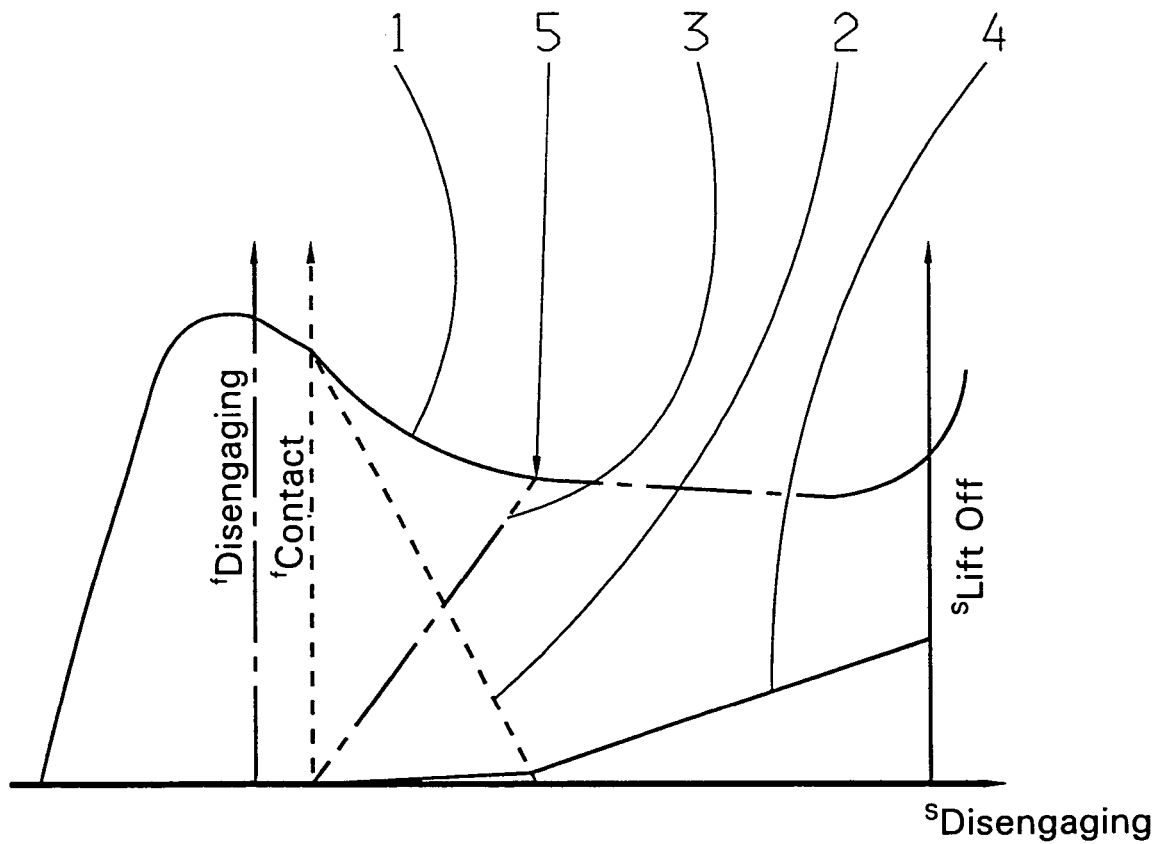
FIG. 1 shows the forces and the paths on the pressure plate and on the disengagement system via the disengagement path.

In the drawing is shown a diagram in which, via the disengagement path, is indicated a diaphragm spring characteristic line with a continuous line 1, a contact force $f_{Contact}$ with dot-dash line 2, a disengagement load $f_{Disengagement}$ with line dot-dash 3 and a lift off path $S_{Lift\,off}$ the clutch with continuous line 4.

A typical curve is shown as diaphragm spring characteristic line. The contact force $f_{Contact}$ starts to diminish when the disengagement load $f_{Disengagement}$ is applied to the disengagement system. The disengagement load $f_{Disengagement}$ is continuously increased until the contact force $f_{Contact}$ reaches the value zero and is thus leveled. A balance of forces then exists. This point is the clutch application point 5.

At the clutch application point 5, a jog appears in the gradient curve of the disengagement force $f_{Disengagement}$ which is indicated by a break in the curve of the disengagement force $f_{Disengagement}$. When the clutch application point 4 is reached, the curve of the lift off $S_{Lift\,off}$ rises, since the clutch system opens further. As the clutch opens further, the disengagement force $f_{Disengagement}$ changes only with the characteristic line of the diaphragm spring.

The disengagement force and spring force can be measured parameters, but they can also be calculated from the given properties of the parts.

REFERENCE NUMERALS 1 curve of the diaphragm spring force
2 curve of the contact force
3 curve of the disengagement load
4 curve of the lift off
5 clutch application point

The invention claimed is:

1. A method for determining a clutch application point in a transmission of a vehicle having a spring-actuated clutch system in which the clutch application point (5) is varied according to a disengagement load abutting on the clutch system, the method comprising the steps of:
   determining the disengagement load along a disengagement path of the clutch as representing a regulated quantity of the clutch system, and
   identifying a jog in a gradient curve of the disengagement load as determining the clutch application point (5).

2. The method according to claim 1, wherein the disengagement load is determined at a plurality of points along the disengagement path to determine at least one section of a gradient curve of the disengagement load before the jog and at least one section of the gradient curve of the disengagement load after the jog.

3. The method according to claim 1, wherein in a mechanically actuated disengagement system a contact force is determined when the clutch is closed by the following equation:

$$F_{Anp}(S) = F_{AnpAP} - i_{Lever} F_{Disengagement}(S)$$

with
   $F_{Anp}(S)$=contact force
   $F_{AnpAP}$=contact force on working point
   $i_{Lever}$=force reinforcement factor
   $F_{Disengagement}(S)$=disengagement load.

4. The method according to claim 3, wherein the disengagement load substantially linearly depends on the disengagement path and is determined by the following equation:

$$F_{Disenagement}(S) = C_{diaphragm\,spring} * S_{Disengagement}$$

with
   $F_{Disengagement}(S)$=disengagement load
   $C_{Diaphragm\,spring}$=spring constant
   $S_{Disengagement}$=disengagement path.

5. The method according to claim 3, wherein the clutch application point (5) is determined when the contact force substantially assumes a value of zero.

6. The method according to claim 3, wherein in the mechanically actuated disengagement system the following equations result:

$$\frac{d}{dS}F_{Disengagement}(S) = C_{Diaphragm\,spring} \text{ for } S\{S_{Application}$$

$$\frac{d}{dS}F_{Disengagement}(S) = \frac{d}{dS}F_{Plate\,spring}(S_{Plate})/i_{Lever} \text{ for } S\}$$

$$S_{Application\,point}$$

there applying $$F_{Disengagement}(S) = F_{Plate\,spring}(S_{Plate})/i_{Lever}$$

with $$\frac{d}{dS}F_{Disengagement}(S) =$$

derivation of the disengagement load (gradient)

$F_{Plate\ spring}(S_{Plate})$=plate spring force
$S_{Application\ point}$=disengagement path corresponds to clutch application point
$i_{Lever}$=force reinforcement factor
$C_{Diaphragm\ spring}$=spring constant.

7. The method according to claim 1, wherein when an actuator is used for control of the disengagement system.

8. The method according to claim 1, wherein at least one time valve is used in a hydraulic actuation of the disengagement system.

9. The method according to claim 8, wherein when one of the clutch is closed, one time valve or when the clutch is open, one clutch closing valve with one of constant or defined pulse width is controlled and that the clutch application point (5) is determined by evaluating the detected disengagement path.

10. The method according to claim 1, wherein when an electric system is used for control of the disengagement system, the clutch application point (5) is determined from the measurements of path, voltage and/or current.

11. The method according to claim 1, wherein when an electropneumatic system is used for control of the disengagement system, the clutch application point (5) is determined from measurements of path and pressure.

* * * * *